United States Patent [19]
Kellar et al.

[11] Patent Number: 5,727,112
[45] Date of Patent: Mar. 10, 1998

[54] VIDEO PROCESSING APPARATUS AND METHOD

[75] Inventors: Paul Roderick Noel Kellar; Robin Alexander Cawley; Anthony David Searby, all of Newbury; Neil Roy Hinson, Kingsclere, all of England

[73] Assignee: Quantel Limited, Newbury, England

[21] Appl. No.: 369,468

[22] Filed: Jan. 6, 1995

[30] Foreign Application Priority Data

Jan. 7, 1994 [GB] United Kingdom ............ 9400245
Mar. 4, 1994 [GB] United Kingdom ............ 9404318

[51] Int. Cl.$^6$ ................ H04N 5/92; H04N 5/76; G11B 27/02
[52] U.S. Cl. ................................ 386/52; 386/109
[58] Field of Search .................. 386/4, 33, 52, 386/64, 69, 70, 83, 95, 109, 111, 112, 125, 126; 358/906, 909.1; 348/722, 578–601; H04N 5/92, 5/76

[56] References Cited

U.S. PATENT DOCUMENTS

| | | | |
|---|---|---|---|
| 4,514,818 | 4/1985 | Walker | 364/521 |
| 4,949,190 | 8/1990 | Thompson . | |
| 4,963,995 | 10/1990 | Lang | 386/54 |
| 5,170,263 | 12/1992 | Hisatake et al. . | |
| 5,206,929 | 4/1993 | Langford et al. | 395/159 |
| 5,262,877 | 11/1993 | Otsuka | 358/343 |
| 5,276,531 | 1/1994 | Chen et al. . | |
| 5,367,341 | 11/1994 | Schnorf | 348/616 |
| 5,383,027 | 1/1995 | Harvey et al. | 358/296 |
| 5,384,667 | 1/1995 | Beckwith | 360/33.1 |
| 5,440,401 | 8/1995 | Parulski et al. | 358/342 |
| 5,577,190 | 11/1996 | Peters | 395/501 |

FOREIGN PATENT DOCUMENTS

| | | | |
|---|---|---|---|
| 0048625 | 3/1982 | European Pat. Off. | H04N 1/41 |
| 0560624 | 9/1993 | European Pat. Off. | H04N 5/262 |
| 0562565 | 9/1993 | European Pat. Off. | H04N 5/278 |
| 0562845A2 | 9/1993 | European Pat. Off. . | |
| 0574216A2 | 12/1993 | European Pat. Off. . | |
| 03042973 | 2/1991 | Japan . | |
| 3042973 | 2/1991 | Japan | H04N 5/225 |
| 2274223 | 12/1992 | United Kingdom | 386/52 |
| WO9317519 | 9/1993 | WIPO | H04N 1/41 |

OTHER PUBLICATIONS

European Search Report dated Apr. 3, 1995.
JAPIO Abstract Accession No. 03380073, English language abstract of Japanese Laid–Open Application No. 03–042973, Section No. 1064, vol. 15, No. 179, p. 155 (May 1991).

Primary Examiner—Thai Tran
Assistant Examiner—Vincent F. Boccio
Attorney, Agent, or Firm—Cooper & Dunham LLP

[57] ABSTRACT

Uncompressed digital video data representing one or more initial video frames is input from a video source 2 to a disc store 14 via a compressor/decompressor 10 or a bypass path 20 and a data bus 12. Thus, data can be stored in the disc store 14 in either compressed or uncompressed form. Video data corresponding to video frames selected for editing are held in a display store 5 in uncompressed or decompressed form and editing and other image processing operations are performed thereon by an image processor 6 under the control of a stylus/touch tablet or other user operable input device. Edited data is output to the bypass path for storage without compression in the store or to the compressor/decompressor for storage in compressed form in the store. The compressor/decompressor may be configured to effect symmetrical real time data compression and decompression or fractal data compression.

18 Claims, 1 Drawing Sheet

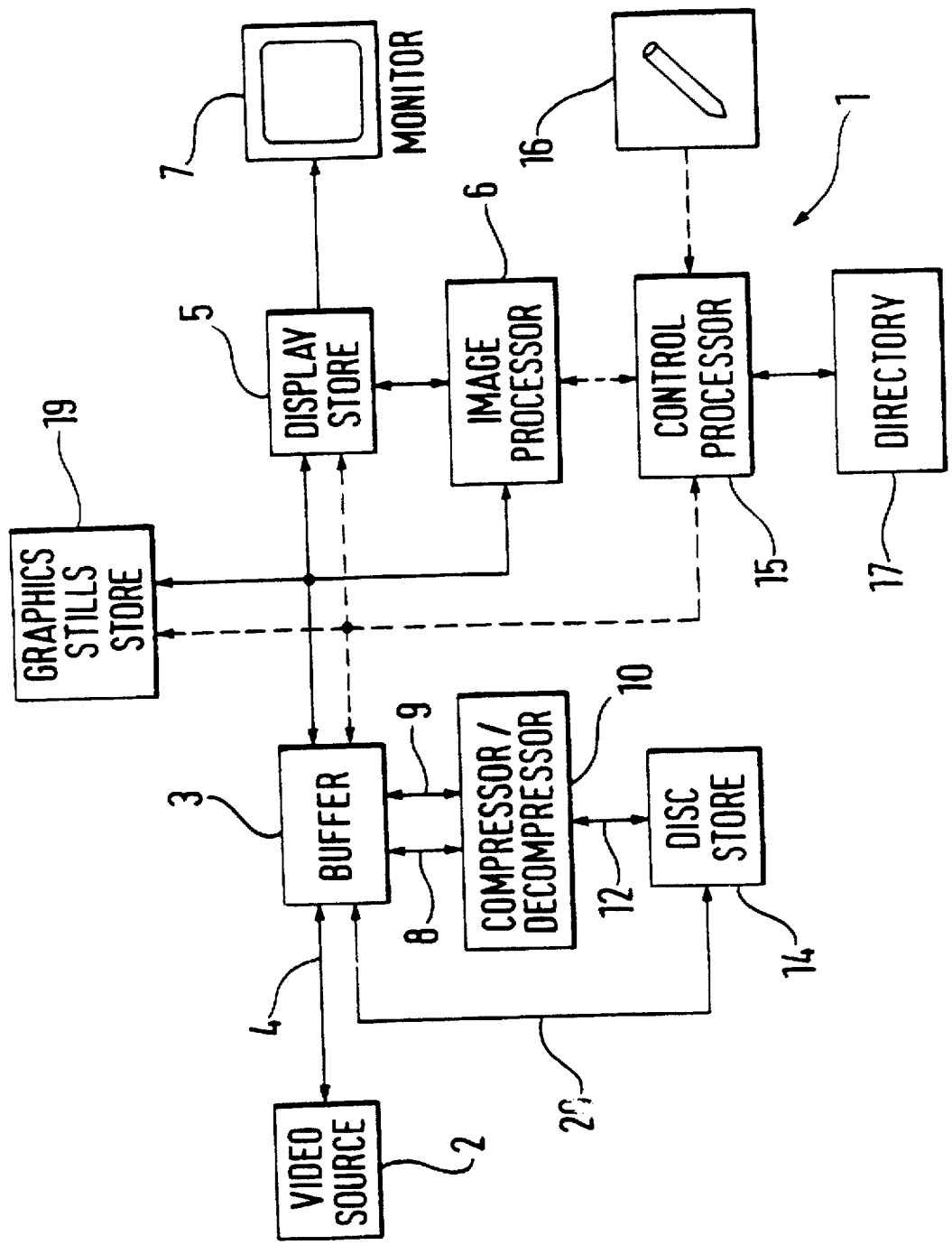

VIDEO PROCESSING APPARATUS AND METHOD

BACKGROUND OF THE INVENTION

1. Field of the Invention

The invention relates to a video processing apparatus and method.

2. Description of the Related Art

Video processing systems for processing digital video data are known. Such systems generally comprise a high capacity store or stores for storing video data representing up to several minutes of video, together with a user controllable editing facility by which stored video frames may be selected for manipulation and/or combination with other stored video frames in order to create an edited video clip.

Commonly owned copending U.S. patent application Ser. No. 08/162,445 filed Dec. 3, 1993 (corresponding to British Patent Appln. No. 9316626.2), the teachings of which are incorporated herein by reference, describes a video processing system manufactured and sold by assignee under the trade mark "HENRY". The described system comprises a bulk store for storing data representing one or more video clips, a video disc store for storing video data representing at least one video clip from the bulk store. The video processing system further comprises an image processor such as that described in commonly owned British Patent Appln. No. 9205503.7 and corresponding U.S. patent application Ser. No. 08/030,823 filed Mar. 12, 1993, the teachings of which are incorporated herein by reference. The image processor is operable under user control to edit video data from the video disc store to create data representing an edited video clip which also is stored in the video disc store. The video disc store may be similar to that store described in commonly owned aforementioned British Patent Appln. No. 9205503.7 and corresponding U.S. patent application Ser. No. 08/030,823 or it may be similar to the store described in commonly owned British Patent Appln. No. 9226199.9 and corresponding U.S. Pat. No. 5,649,046 filed Dec. 3, 1993, the teachings of which are incorporated herein by reference. Thus, the video disc store may comprise several disc store devices in parallel interfaced to two bidirectional data paths each capable of conveying data representing video clips at video rate. The disc store devices together provide a video disc store having a relatively high storage capacity for such a device, typically 20 GBytes (GB) and the video disc store is thus able to store data representing up to about fifteen minutes of video for processing by the image processor. The two bidirectional data paths enable the video disc store to output and/or receive simultaneously data corresponding to two video clips each at video rate.

The high capacity and high data transfer rates provided by the above discussed video disc store enables on-line editing of lengthy video clips to be effected. That is to say the initial video and the resulting edited video are of broadcast quality and therefore the edited video can be encoded for broadcast transmission without the need for further processing.

Commonly owned aforementioned British Patent Appln. No. 9316626.3 and corresponding U.S. patent application Ser. No. 08/162,445 also describe a second video processing system manufactured and sold by assignee under the trade mark "MICRO HENRY". The described second system includes an image processor operable under user control as an off-line editor. In contrast to the HENRY video processing system, the MICRO HENRY video processing system comprises a disc storage device which, while containing several platters together capable of storing around 4 GB of data, has a significantly smaller capacity than the previously discussed video disc store. The disc storage device is connected to receive and to output data via a compression/decompression circuit which may be similar to the circuit described in commonly owned British Patent Appln. No. 9312039.2 and corresponding U.S. patent application Ser. No. 08/255,260 filed Jun. 7, 1994. The compression/decompression circuit serves to compress incoming data to about ⅟₂₀ prior to the data being stored in the disc storage device. A factor of about ⅟₂₀ is usually acceptable in that it reduces significantly the amount of data to be stored without causing unacceptable picture degradation through generation losses. The use of data compression enables data representing up to about 60 minutes of video to be stored in a 4 GB storage device.

The processing and editing operations performed by the MICRO HENRY image processor are executed on uncompressed video data and it is therefore necessary to decompress compressed video data from the disc storage device before the data is output to the image processor. Also, the edited video data output from the processor must be compressed before it is stored in the storage device. If further processing or editing is subsequently to be performed on the edited video data, the same must again be decompressed prior to the processing and then be compressed once again. The process of compression and decompression a number of times inevitably leads to some degradation in the video image. Compression techniques are now so good that the degradation is usually not noticeable to the untrained eye, especially if only one or two compression and decompression operations are performed on the video data. While it is not intended that assignee's MICRO HENRY system should be used as an on-line editing facility it has been found that that is indeed how it is being used by editors who are prepared to accept some image degradation in order to save costs. While slight image degradation, in the form of barely visible artifacts in the image as a result of one or two compression and decompression operations, may be acceptable, the degree of degradation is variable in a manner that the user may not be able to predict and therefore is generally unacceptable.

Image degradation is also dependant on the noise in the image. In the compression technique described in commonly owned British Patent Appln. No. 9312039.2 and corresponding U.S. patent application Ser. No. 08/255,260, a fixed file size is allocated to each video image frame and a quality factor is selected on a frame-by-frame basis so that each frame is compressed to fit into the available file space. A noisy picture, such as a busy scene of a sports crowd for example, will require greater compression and will tend to show more unwanted artifacts when it is subsequently decompressed than will a less noisy or "clean" picture, such as a graphic drawn using an electronic image processing system, when it is subsequently decompressed.

It is not unusual for an editor to wish to combine a clean picture with a noisy picture. For example the editor may wish to superimpose a title or other clean foreground graphic over a crowd scene or other background picture during a sports programme. As a result of compression the quality of the noisy background picture will have been reduced significantly in order to compress the data to fit into the fixed file size. When the decompressed background data and clean foreground data are combined the resulting composite picture data will still be noisy because the crowd scene will constitute the larger portion of composite image. During compression of the composite picture the clean areas of the picture corresponding to the foreground title will be subject to the same degree of compression as the areas of the picture corresponding to the noisy background. Consequently, the title will suffer greater degradation and the introduction of more visible artifacts than it might otherwise, and since the title was originally clean the degradation appears more pronounced.

SUMMARY OF THE INVENTION

The present invention aims to solve at least some of the above discussed problems.

According to one aspect of the invention therefore there is provided a video processing apparatus comprising: a source of uncompressed digital video data representing one or more initial video frames; a store for storing digital video data on a frame random access basis; a data compressor/decompressor for compressing video data to produce compressed video data for storage in the store and for decompressing compressed data from the store to produce decompressed data; and a bypass path for bypassing the data compressor/decompressor in order to enable uncompressed and decompressed data to be written to and read from the store.

According to another aspect of the invention there is provided a method of processing digital video data, the method comprising: supplying uncompressed digital video data representing one or more initial frames; compressing supplied video data relating to first selected initial video frames to produce compressed video data; storing the compressed video data; decompressing stored compressed video data to produced decompressed video data; processing the decompressed video data to produce processed video data; and storing without compression the processed video data.

According to a further aspect of the invention there is provided a video processing system comprising a source of frames of digital video data, random access disc storage means for storing frames of data supplied thereto from said source and for writing frames therefrom to said source, display store means capable of storing for processing and display a plurality of video frames stored in said storage means, a display monitor operatively connected with said display store means and capable of displaying a plurality of frames stored in said display store means, control processor means operable under manual control for supplying video frames from said storage means to said display store and for determining whether each frame supplied from said source to the storage means is to be stored therein in compressed or uncompressed form, a data compressor and decompressor for compressing frames from said source selected by said control processor means for storage in said storage means in compressed form, image processor means for combining uncompressed frames, or compressed frames after decompression thereof in said data compressor and decompressor, or a compressed frame after decompression thereof in said data compressor and decompressor and an uncompressed frame, and means for storing each combined frame in uncompressed form in said storage means.

The above and further features of the invention are set forth with particularity in the appended claims and together with advantages thereof will become clearer from consideration of the following detailed description of an exemplary embodiment of the invention given with reference to the accompanying drawing which shows a schematic block diagram of a system embodying the invention.

BRIEF DESCRIPTION OF THE DRAWING

The accompanying FIGURE relates to a video processing system according to an embodiment of the present invention.

DETAILED DESCRIPTION OF THE PREFERRED EMBODIMENTS

Turning now to the accompanying drawing there is shown a video processing system 1 comprising a video source 2, which may for example be a video tape recorder, which provides digital data representing one or more video frames which together form one or more video clips. Thus, the source 2 serves as a library of video clips and provides a means by which archived video clips can be retrieved for use during editing. Alternatively, the source might be a video camera or a laser disc or any other device which can provide digital video data. Video data representing each video clip is output from the source in a noncompressed digital component format, for example a format corresponding to the so-called D1 standard.

The system 1 comprises a buffer 3 which is connected to the source 2 via a data path 4 having sufficient bandwidth to enable data relating to at least one video clip to be transferred thereover at video rate (e.g. 22 MBytes for a full colour picture according to the standard CCIR 601). The buffer 3 is also connected to a display store 5 and an image processor 6. The buffer 3 provides an interface between the source and the display store 5 and the image processor 6, and is used to transfer incoming video clip data from the source 2 to the display store 5 for display on a monitor 7 connected thereto. This enables an incoming video clip from the source to be previewed on the monitor 7 by the use during selection of a clip for editing.

The display store 5 provides for the image processor 6 a large scratch pad store for storing data relating to several frames of video during editing. The image processor 6 processes the frame data therein to produce respective frames of reduced size for concurrent display at different portions of the monitor 7, as described in greater detail in commonly owned aforementioned British Patent Appln. No. 9205503.7 and corresponding U.S. patent application Ser. No. 08/030,823. The image processor 6 is able to control the output of one piece of video from the display store 5 simultaneously to several different places on the monitor 7 or to output several pieces of video to a common area on the monitor. Thus, the image processor 6 and the display store together are able to present video clips on the monitor 7 in several different ways for manipulation and modification by a user of the system. The image processor 6 comprises two separate processing units (not shown) for producing simultaneously images of reduced size from data supplied via the buffer 3.

The buffer 3 is also connected via two bidirectional busses 8, 9 to a compressor/decompressor circuit 10, which may be any suitable known circuit or circuits, for example the circuit described in commonly owned British Patent Appln. No. 9312039.2 and corresponding U.S. patent application Ser. No. 08/255,260. The compressor/decompressor circuit 10 is connected with a disc store 14. Compressed video data is transferred between the compressor/decompressor 10 and the disc store 14 via a data bus 12. The disc store 14 has a capacity of about 4 GB which enables the store to store compressed video data representing approximately one hour of video on a frame random access basis. That is to say the disc store 14 is a frame random access store and therefore the data defining any video frame can be selected at random from the disc store without the need to sequence through data relating to other frames during the accessing. The disc store 14 is used to store data from the source 2 defining video clips selected for editing.

The system 1 further comprises a control processor 15 which is connected to the buffer 3, the display store 5 and the image processor 6. The control processor 15 controls modifications and processing applied to video data by the image processor 6 during editing. Control paths from the control processor 15 are shown as broken lines in the drawing. During editing the control processor 15 controls the transfer of video clip data from the buffer 3 to the display store 5 and from there to the monitor 7 for display. Also, control data from the control processor 15, identifying such things as frames required for display and/or processing, is used in the transfer of video data to and from the disc store 14.

The control processor 15 also controls the image processor 6 so that it performs desired operations and effects functions on selected frames in the video clips including the generation of keying signals, modification of color, changing of texture, or spatial effects such as changes of size, position and/or spin. These operations and effects are per se well known and require no further explanation herein.

The selection and modification of video clips and frames within the clips is controlled by a user manipulatable stylus and touch tablet device 16 which can be used to select any one of a number of predefined functions defined in a directory 17 accessible by the control processor 15. The selectable functions are presented in a menu (not shown) displayed on a portion of the monitor 7 and are selectable by user manipulation of the stylus/touch tablet device 10.

A graphic stills store 19 is connected directly to the display store 5 and buffer 3 and provides digital data representing selected video stills for use during editing. The video stills may be any form of image, for example a picture depicting a scene, or a graphic caption intended to be superimposed over, say, a crowd scene. Clearly, data which is stored in the disc store in uncompressed form should not be subjected to decompression and therefore a bypass path 20 is provided between the buffer 3 and the disc store 14 to enable the uncompressed data to bypass the decompressor circuit 10 when the data is output from the disc store 14 for processing by the image processor 6. Selection of the bypass path 20 is made automatically by the control processor 15 in response to data from an editing memory (not shown) contained within the control processor indicating that the frame of data is stored in uncompressed form. The bypass path 20 enables uncompressed data from the source 2 to bypass the compressor circuit 10 for storage in uncompressed form in the disc store 14.

Further operation and use of the system 1 will now be described with reference to an exemplary editing operation. In the following description video data which is stored in the store in compressed form will be referred to as compressed data, video data which is stored in the store or used directly without first being compressed will be referred to as uncompressed data, and data which has been stored in the store and read therefrom via the decompressor circuit will be referred to as decompressed data.

Video data relating to a video clip or clips to be edited are input from the video source 2 to the buffer 3 and displayed on the monitor 7. A decision can be made by the user at this time as to whether or not the incoming data is to be compressed before it is stored in the disc store 14. If the clip is relatively short or if it is important that the high quality of the image be maintained then the user may elect to store the incoming data in uncompressed form in the disc store 14. In this case, the incoming data is output from the buffer along path 20 for storage in the disc store 14. Frequently, however, the incoming video data will be output from the buffer 3 to the compressor circuit 10 via one of the bidirectional paths 8 or 9. The compressed data output from the compressor 10 is transmitted via bus 12 to the disc store 14. Graphic stills data from the store 19, representing for example a caption or other graphic, is input directly in uncompressed form to the display store 5 and may also be transmitted by way of the buffer 3 and the path 20 for storage in the disc store 14 in uncompressed form. Thus, the disc store 14 will contain both compressed and uncompressed data representing various different video clips and images.

Video data can only be edited if it is in uncompressed or decompressed form. Video data representing a clip to be edited is selected by the user by manipulation of the stylus/touch tablet device 16 which causes a cursor (not shown) to be moved on the monitor enabling functions to be selected from the directory 17. When compressed data is to be edited, the data is output from the disc store 14 over the data bus 12 and is input to the decompressor circuit 10. Decompressed data from the decompressor circuit 10 is input to the buffer 3 via one of the bidirectional data paths 8, 9. When uncompressed data is selected for editing, the same is output from the disc store 14 via the bypass path 20 to the buffer 3. Uncompressed or decompressed data from the buffer 3 is then transferred to the display store for editing together with data required for the edit existing in the stills store 19, assuming that that data does not already exist in the disc store 14. (The data may already be stored in the disc store 14 if for example a decision has been made to create a sequence of output frames comprising solely a still graphic forming say a title on a background of uniform color).

In the following it will be assumed that an editing operation is to be performed by placing a foreground caption over a background picture, and that the foreground caption is a "clean" image such as a graphic and that the background picture is a "noisy" picture such as a crowd scene. Of course it should be appreciated that other and more complex editing operations can also be performed using the system 1.

Data representing the uncompressed foreground caption is read from the graphics stills store 19 to the display store 5 and compressed data representing the background video picture is decompressed and then placed in the display store 5. The uncompressed foreground caption is then combined with the decompressed background video picture on a video frame-by-frame basis using known methods to produce an edited clip. Once the edited clip has been produced to the satisfaction of the user, data representative of each frame thereof is written back to the disc store 14. The frames of the edited clip contain both uncompressed and decompressed data, and if the data were compressed by the compressor circuit 10 before being stored in the disc store 14, then the previously discussed unacceptable artifacts would be introduced into the edited clip and be most noticeable in the foreground caption. Therefore, the system is arranged such that the edited clip data is output from the buffer 3 via the bypass path 20 for storage without compression in the disc store 14 together with the original compressed video data.

It is not unusual for an edit to be applied to only a small portion of a relatively long clip. It is convenient to be able to store the long clip in the disc store 14 in compressed form and then edit the short section and store the edited short section in decompressed form in the disc store 14. When editing has been completed the entire clip can be read from the disc store 14 with unedited portions being output via the decompressor circuit and the edited portion being output via the bypass path 20. In this way, image quality over the entire length of the clip is constant because each portion of the clip is only compressed and decompressed once. Furthermore, areas which are susceptible to the generation of visible artifacts, such as a graphic drawn using an electronic image processing system, are never compressed and therefore the artifacts do not occur in these areas. This makes use of the system 1 very predictable. While a decision can be made at the outset not to compress the data for a given clip, no decision need be made because the data is never compressed more than once. Thus, the quality of the image is highly predictable and there is no need to make a trade off decision between storage space and quality. Consequently, there is no need for the user to have any prior knowledge during the initial transfer of data from the source 2 to the disc store 14 of the processing that will be applied to a clip during editing. Naturally, if the system is being used merely for the purpose of off-line editing, the intention of the user from the outset being to use the editing data stored in an editing memory (not shown) contained in the control processor 15 and subsequently to repeat the editing using an on-line facility, then storage space in the store 14 can be saved by the user overriding the system and causing data representing the edited clip to be compressed before being stored in the store.

The foregoing description has assumed that the compression and the decompression of data in the compressor/decompressor circuit 10 are symmetrical and can take place in real time, as is the case for example with discrete cosine transform coding, which forms the most commonly used part of the so-called JPEG standard. However, because in the system described the amount of time needed for writing edited data to the disc store 14 is small, the system allows the use of higher quality asymmetrical compression techniques, for example fractal based transforms.

Fractal based compression is complex and slow and as a result it is not possible using presently available technology to employ fractal compression techniques to compress video images in real time. For this reason assignee, and other manufacturers of high quality image processing systems, have not employed fractal compression techniques. Fractal based decompression, in contrast, is simple and fast and this can be used to advantage in the system 1 as will now be described.

The compressor 10 may be configured to effect fractal compression without the knowledge of or any interaction with a user of the system by employing in an off-line manner a fractal compressor such as the multi-board compressor manufactured by Iterated Systems Inc. This compressor is able to effect a 5:1 compression of video data at approximately 1/10 real time (i.e. 1/10 video rates) which means that it would take about 50 minutes to transfer 5 minutes of video data from the video source 2 to the disc store 14 via the compressor 10. If this approach was adopted it would result in an unacceptable delay. Instead of being input via the compressor 10, therefore, user selected video data from the video source 2 is first written to the disc store 14 in uncompressed form via the bypass path 20. Once the video data has been transferred from the source 2 to the store 14 (or the store is full with approximately 5 minutes of video data) the data is read a frame at a time from the disc store 14 to the compressor 10 where it is compressed. As each frame of data is compressed the uncompressed data in the disc store 14 is deleted and the compressed data is written to the store 14 instead of the uncompressed data. As the fractal compression progresses an increasing amount of free space becomes available in the disc store 14. Thus, for example after 10 minutes, space for about 1 minute of uncompressed or decompressed video data is available.

This compression of uncompressed data in the store 14 continues off-line and once sufficient free space is available in the disc store 14 editing can commence. During editing frames of data are selected by the user as previously described. Data for the selected frames is read from the disc store 14 to the display store 5 for processing by the image processor 6. If the data from the store 14 has not yet been compressed by the compressor 10 then it is simply read via the path 20 in order to bypass the decompression circuitry 10. If, however, the data has been compressed then it is read from the disc store 14 via the decompressor 10. As has previously been mentioned fractal based decompression is both simple and fast and this makes it possible for a frame of compressed data to be read from the store 14, decompressed by the decompressor 10 and stored in the display store 5 in a time period corresponding to a video frame period. In other words, frames of compressed data can be read from the store 14 and decompressed for output at the same rate at which uncompressed data is read from the store for output via the bypass path 20. Therefore, it remains possible to access frames on a frame random access basis at video rates for both compressed and uncompressed data.

The free space made available in the disc store 14 by virtue of the fractal compression of the data is used to store edited data produced by the image processor 6 as previously described. The control processor 15 is, of course, arranged to control the transfer of data to and from the disc store 14 so that each video frame is represented by data which has been compressed no more than once.

The compression of all of the data in the disc store 14 from the source 2 makes available about 4 minutes of free space in the disc store 14 for storing data representing edited frames created by the image processor 6. Bearing in mind that it is not unusual for an edit to be applied to only a small portion of a relatively long clip, it will be appreciated that space for 4 minutes of edited video is more than adequate for most editing situations.

Once editing is complete data representing the edited clip is read from the disc store 14 via the decompressor 10 or the bypass path 20 as appropriate for broadcast or for further processing elsewhere as required.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:
1. A video processing apparatus comprising:
   a source of uncompressed digital video data representing one or more initial video frames;
   a buffer for receiving uncompressed video data from the source;
   a frame random access store for storing digital video data, the store being connected to the buffer for receiving said uncompressed data therefrom and supplying said uncompressed data thereto;
   a data compressor/decompressor for compressing said uncompressed video data frame by frame to produce compressed video data and for decompressing said compressed video data frame by frame to produce decompressed video data, the compressor/decompressor being connected to the buffer and the store for compressing data from the buffer for storage in the store and for decompressing said compressed data from the store for supply to the buffer;
   a control processor for controlling the buffer to select said video data for transfer between the buffer and the store in uncompressed form and said video data for transfer between the buffer and the store via the compressor/decompressor; and a video processor for receiving said uncompressed and said decompressed video data from the store under the control of the control processor, for producing processed data representing a processed video frame by combining said uncompressed data representing one video frame and said decompressed data representing another video frame, and for supplying the processed data to the buffer for storage as uncompressed data in the store.

2. The video processing apparatus as claimed in claim 1, wherein the data compressor/decompressor is configured to effect symmetrical real time data compression of video data input thereto.

3. The video processing apparatus as claimed in claim 1, wherein the data compressor/decompressor is configured to effect fractal data compression of video data input thereto.

4. The video processing apparatus as claimed in claim 3, wherein the fractal data compression is effected in an off-line manner to selected data previously stored in the store in uncompressed form.

5. The video processing apparatus as claimed in claim 1, wherein the video processor is arranged to effect user selected processing operations to video data input thereto to produce processed video data representing one or more processed video frames.

6. The video processing apparatus as claimed in claim 5, further comprising user operable input means for enabling a user to input commands to the control processor.

7. The video processing apparatus as claimed in claim 5, further comprising a video stills source connected to input digital video data representing one or more initial video stills in uncompressed form to the video processor or the buffer.

8. The video processing apparatus as claimed in claim 5, wherein the video processor comprises an image processor connected to the buffer for effecting image processing operations on selected video data input thereto.

9. The video processing apparatus as claimed in claim 6, wherein the user operable input means comprises a stylus and touch tablet device.

10. The video processing apparatus as claimed in claim 8, wherein the video processor further comprises a display store connected to the buffer for storing data representing one or more selected video frames input thereto, the image processor being connected to the display store for the processing of data stored therein to produce said processed video data.

11. The video processing apparatus as claimed in claim 10, further comprising a monitor connected to the display store for displaying images derived by the image processor from data in the display store.

12. The video processing apparatus as claimed in claim 8, further comprising a directory associated with the control processor for storing algorithms and data relating to user selectable image processing operations.

13. The method of processing digital video data, the method comprising:

supplying uncompressed digital video data representing initial video frames;

selecting supplied data representing some initial video frames for storage in compressed form;

compressing the selected video data relating to said some initial video frames on a frame by frame basis to produce compressed video data;

selecting supplied data representing other initial video frames for storage in uncompressed form;

storing the compressed and the uncompressed selected video data in a store;

receiving compressed and uncompressed stored video data from the store;

decompressing the received compressed video data to produced decompressed video data;

processing the decompressed and the uncompressed video data to produce processed video data representing a processed video frame by combining the uncompressed data representing one video frame and the decompressed data representing another video frame; and storing the processed video data as uncompressed data in the store.

14. The method as claimed in claim 13, further comprising storing in uncompressed form video data relating to second selected video frames, and processing the stored uncompressed data to produce said processed video data.

15. The method as claimed in claim 14, wherein symmetrical real time data compression is effected in order to produce said compressed data.

16. The A method as claimed in claim 14, wherein fractal data compression is effected in order to produce said compressed data.

17. The A method as claimed in claim 16, wherein the fractal data compression is effected in an off-line manner to previously supplied uncompressed data.

18. The method as claimed in claim 13, further comprising providing video stills data for storage in uncompressed form and processing said uncompressed stills data together with said decompressed video data to produce processed video data.

* * * * *